(12) United States Patent
Meyuhas et al.

(10) Patent No.: US 11,595,910 B2
(45) Date of Patent: Feb. 28, 2023

(54) DEVICES AND METHODS FOR DISCONNECTION PROTECTION

(71) Applicant: Intel Corporation, Santa Clara, CA (US)

(72) Inventors: Gil Meyuhas, Tel-Aviv (IL); Dor Chay, Haifa (IL); Nir Yizhak Balaban, Kfar Netter (IL); Rony Ross, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/474,089

(22) Filed: Sep. 14, 2021

(65) Prior Publication Data
US 2022/0201621 A1    Jun. 23, 2022

(30) Foreign Application Priority Data
Dec. 23, 2020  (EP) .................................... 20216898

(51) Int. Cl.
| | | |
|---|---|---|
| *H04W 52/24* | (2009.01) | |
| *H04W 76/30* | (2018.01) | |
| *H04W 52/22* | (2009.01) | |
| *H04W 52/36* | (2009.01) | |
| *H04W 52/54* | (2009.01) | |

(52) U.S. Cl.
CPC ....... *H04W 52/241* (2013.01); *H04W 52/223* (2013.01); *H04W 52/367* (2013.01); *H04W 52/54* (2013.01); *H04W 76/30* (2018.02)

(58) Field of Classification Search
CPC .................. H04W 52/00–60; H04W 76/30
See application file for complete search history.

(56) References Cited

U.S. PATENT DOCUMENTS

| | | | | |
|---|---|---|---|---|
| 10,355,810 | B1* | 7/2019 | Muthuswamy | H04L 1/0009 |
| 2014/0200046 | A1* | 7/2014 | Sikri | H04B 17/345 |
| | | | | 455/552.1 |
| 2014/0274179 | A1* | 9/2014 | Zhu | H04W 52/243 |
| | | | | 455/509 |
| 2014/0357313 | A1* | 12/2014 | Mercer | H04W 88/06 |
| | | | | 455/552.1 |
| 2014/0370929 | A1* | 12/2014 | Khawand | H04B 1/3838 |
| | | | | 455/522 |

(Continued)

FOREIGN PATENT DOCUMENTS

| | | |
|---|---|---|
| CN | 110741691 A | 1/2020 |
| WO | 2012040346 A1 | 3/2012 |

OTHER PUBLICATIONS

European Search Report issued for the corresponding European Application No. 20 21 6898, dated Jun. 2, 2021, 1 page (for informational purposes only).

*Primary Examiner* — Raymond S Dean
(74) *Attorney, Agent, or Firm* — Viering, Jentschura & Partner mbB

(57) ABSTRACT

A device including one or more processors configured to: determine a disconnection margin value based on: a current transmission operation state including one or more transmission control parameters, and a current transmission rate; receive a power back-off (PBO) request including a PBO value; perform a comparison of the PBO value to the disconnection margin value; and determine whether to apply a PBO according to the PBO request based on the comparison.

20 Claims, 7 Drawing Sheets

100

(56) References Cited

U.S. PATENT DOCUMENTS

| | | | |
|---|---|---|---|
| 2015/0160780 A1* | 6/2015 | Park | G06F 3/0488 |
| | | | 345/173 |
| 2016/0174162 A1* | 6/2016 | Nadakuduti | H04B 1/3838 |
| | | | 455/67.11 |
| 2017/0142721 A1* | 5/2017 | Azizi | H04L 5/0044 |
| 2020/0162964 A1* | 5/2020 | Srinivasa | H04W 28/065 |

* cited by examiner

DEVICES AND METHODS FOR DISCONNECTION PROTECTION

CROSS-REFERENCE TO RELATED APPLICATION

This application claims priority under 35 U.S.C. § 119 to European Application No. 20 21 6898.5 filed on Dec. 23, 2020, which is herein incorporated by reference in its entirety.

TECHNICAL FIELD

Various aspects relate generally to wireless communications and transmit power control techniques.

BACKGROUND

New developments in modern communication technologies, such as 5G New Radio (NR) and Wireless Local Area Networks (WLANs) such as Wi-Fi, have been directed at utilizing higher radio frequencies in the millimeter wave (mmWave) spectrum and also utilizing beamforming to improve throughput and reduce frequency with existing wireless systems. While these techniques provide many advantages, they may also increase radio frequency (RF) radiation in the environment, including to users. For example, this may include device transmissions that deliver elevated levels of radiation energy to a focused area. When this focused area is directed in the direction of the user, the device may deliver high levels of radiation to the user and the signal quality may also be significantly degraded. The amount of radiation energy emitted absorbed by a unit of mass of a user over time may be defined as the specific absorption rate (SAR).

Various regulators, including the Federal Communications Commission (FCC) and the International Commission on Non-Ionizing Radiation Protection (ICNIRP), and standardization bodies like the $3^{rd}$ Generation Partnership Project (3GPP) have introduced SAR measures that limit the amount of radiation that a device can deliver to users. In response, methods and devices that implement time-averaging SAR (TAS) mechanisms have been introduced to comply with these regulatory measures.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
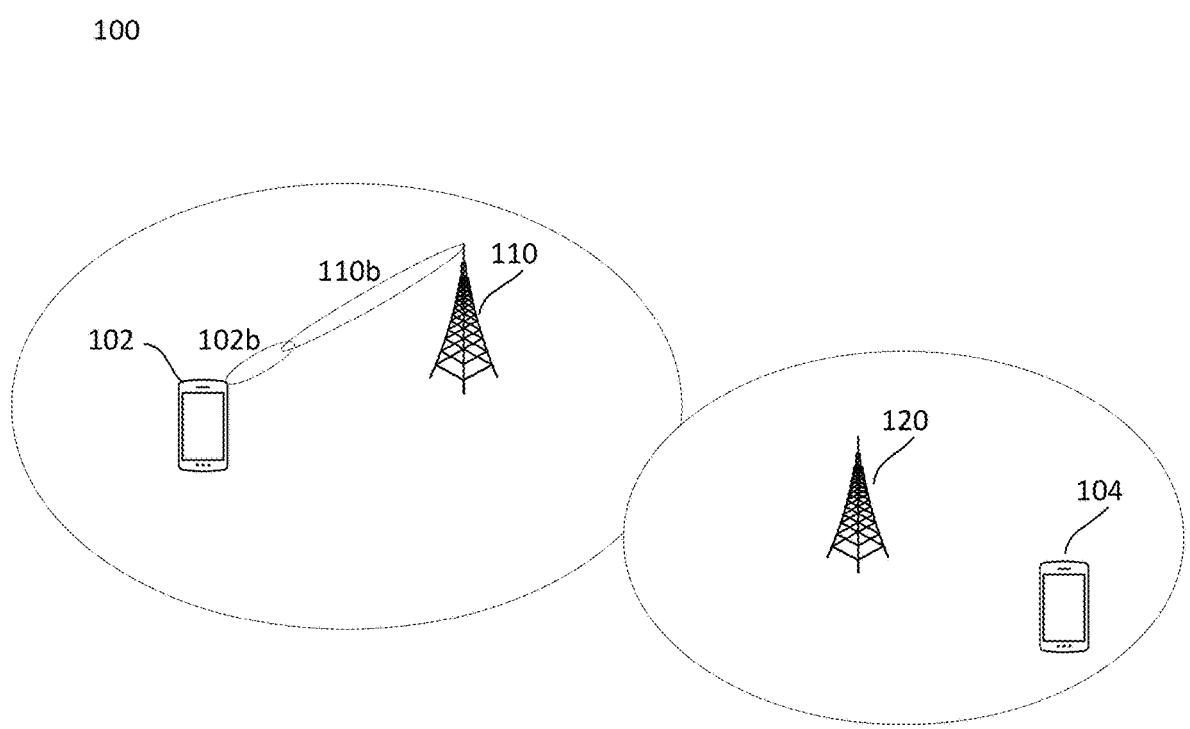
FIG. 1 exemplarily shows a radio communication network according to some aspects.

TAS mechanisms generally aggregate the power used in device transmissions over a time period (e.g., an averaging window) and use this aggregated power to determine a corresponding energy to compare to a transmission (Tx) energy budget. The Tx energy budget may include considerations to comply with SAR regulations issued by authorities or by standardization committees. TAS mechanisms may include implementing the Tx energy budget over the time period to ensure that SAR limits are not exceeded. In this manner, TAS mechanisms may be configured to compare the amount of spent energy to the TAS Tx energy budget for the time window and control the Tx power accordingly. In some aspects, this time window may be based on a geographic area (e.g., a country) and/or communication channel frequency band. For example, the time window may be in the range of 30 seconds, 60 seconds, 100 seconds, 6 minutes. The exact determination of the time window may depend on the geographic area (e.g., a country) and/or communication channel frequency band.

Devices may be configured to control the Tx power by applying a power back-off (PBO) that limits the Tx power to lower levels or by applying a time back-off (TBO) that prevents transmissions for a certain period of time. If the energy budget is nearly spent, or within certain margins, TAS mechanisms may apply a back-off (BO) in the form of a PBO or a TBO. While each of these options has their share of advantages and disadvantages, such as differences in throughput, connection range, and latencies, TAS mechanisms are configured to decide between using each of the two options (PBO vs TBO) and/or determine whether to alternate or use a combination of the two.

When applying a PBO, the PHY rate of the wireless communications may be degraded due to the lower Tx power. In cases where the signal quality strength indicator (SQSI) is already low, such a PBO may actually cause the transmission to fail or may cause the device to disconnect from the associated communication partner (e.g., a network access node). The SQSI may be a received signal strength indication (RSSI), for example, or any other values that indicate the strength of the signal quality, e.g., signal to noise ratios, etc. On the other hand, applying a TBO may introduce an overall degradation of the Tx throughput in comparison to the PBO. However, in some cases, choosing the TBO over a PBO when the device is near a disconnection point (i.e., when the SQSI is low) will allow the device to at least stay connected.

In some aspects, the methods and devices of this disclosure are configured to identify when a device is at risk of near-disconnection when the TAS functionality is enabled and use this identification as a trigger to choose to apply a TBO instead of a requested PBO in order to maintain the link connection. In this manner, the devices and method disclosed herein comply with SAR regulatory or standardized SAR limits while also decreasing the risk of disconnection when the device connection is already weak.

In other words, TAS mechanisms may control or limit the Tx target power by applying a PBO to control the average transmission energy level, and the disclosure herein provides supplementary features to the TAS mechanisms that include determining scenarios where a TBO would be a better choice to maintain a network connection over a requested PBO.

In some aspects, methods and device configured to determine a disconnection margin value based on a current transmission operation state including one or more transmission control parameters, and a current transmission rate; receive a power back-off (PBO) request including a PBO value; perform a comparison of the PBO value to the disconnection margin value; and determine whether to apply a PBO according to the PBO request based on the comparison. The PBO may be applied if the PBO value being less than disconnection margin value. If the PBO is not less than the disconnection margin value, however, then a time back-off (TBO) may be applied instead of the PBO. The PBO value may indicate a value corresponding to a requested reduction in Tx power of a current Tx power. The current transmission rate may be directly correlated with the current Tx power. For example, a higher Tx power may provide a higher transmission rate.

The methods and devices of this disclosure provide numerous advantages, including, but not limited to: extending the connection versus attenuation to the same extent as when there is no SAR limit or SAR indication at all; maximizing Tx throughput under any SQSI level; improving cell and spectral density of wireless cells by reducing time spent on transmission over the air (OTA) when the SQSI is low and near disconnection; and transmitting the maximum energy but still complying with regulation limits.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UE), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

Figure 2:
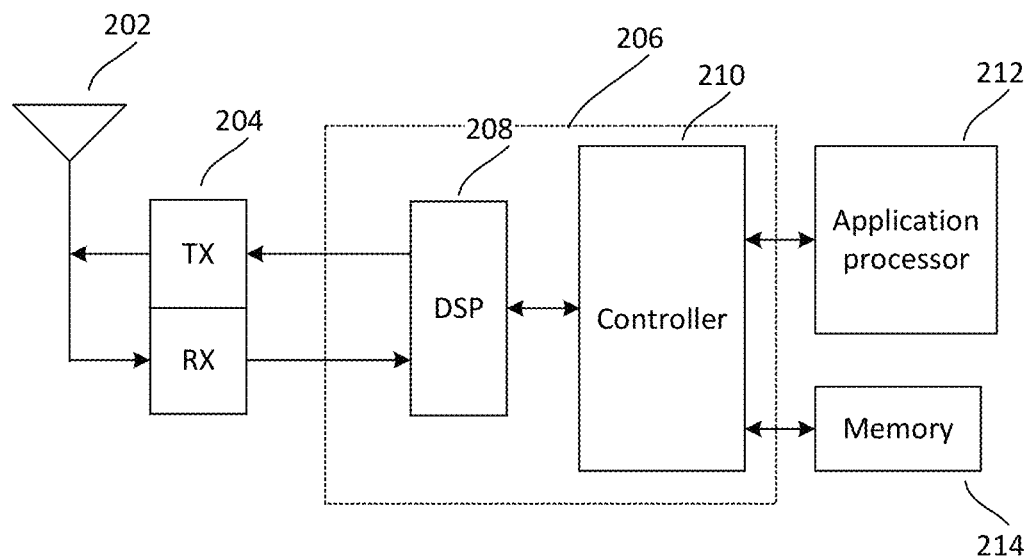
FIG. 2 exemplarily shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., 5G, NR, LTE, or other 3rd Generation Partnership Project (3GPP) networks, WLAN/Wi-Fi, Bluetooth, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipment (UE), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WLAN APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WLAN, mmWave, etc., any of which may be applicable to radio communication network 100.

As shown in radio communication network 100, terminal device 102 and network access node 110 may each use beamforming techniques 102b and 110b, respectively, for communicating with one another. Each may both have at least one RF chain and multi-antenna arrays. Accordingly, the devices shown in network 100 may be capable of bidirectional beamforming. If a user is in the direction of the beam 102b, for example, the user may be subject to increased SAR levels. In order to comply with regulatory measures, terminal device 102 may need to implement TAS mechanisms so that the amount of energy transmitted in the direction of the user does not violate (i.e., go over) a TAS energy budget for a given period of time. However, in addition to complying with these regulatory measures, terminal device 102 must also attempt to maintain a robust wireless link with network access node 110 to ensure communication quality is not degraded.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FIG. 2, in some aspects antenna system 202, RF transceiver 204, digital signal processor 208, and/or protocol controller 210 may encompass separate components dedicated to different radio communication technologies.

The terminal device 102 may also include application processor 212 and memory 214. Application processor 212 may be a CPU and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120.

Figure 3:
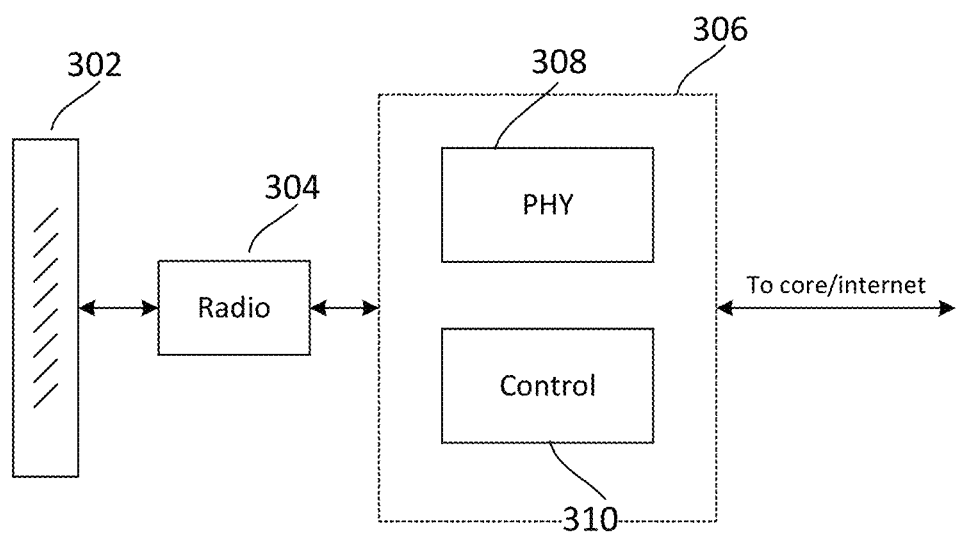
FIG. 3 exemplarily shows an internal configuration of a network access node in some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

In some aspects, the disclosure herein provides a method to perform TAS methods while maintaining the link connection as if there was no SAR indication or SAR/TAS power limits on the transmission functions at all. This method allows the device to identify when the terminal device is in a near-disconnection risk when the TAS functionality is enabled and uses the indication of the near-disconnection (ND) as a trigger to determine whether it would be better to choose a TBO instead of a requested PBO to maintain link connection. Accordingly, the methods and devices disclosed herein may include or be based off of the following features.

A first feature is a near disconnection (ND) database (DB) that includes values for each PHY rate that indicates how much attenuation the PHY rate may absorb until it is in risk of not being able to maintain a properly functioning PHY rate that ensures link connection. This may correspond to a certain rate of degradation of PHY and/or RF limitations. The ND DB may therefore include values that correspond to any given state of the link control, PHY rates, power restrictions, channels, bandwidth, modulation scheme, antenna diversity scheme (SISO, MIMO, beamforming schemes, etc.), channel state or condition.

A second feature is the computation of the disconnection margin (DM). This computation estimates the PBO margin to disconnect based on the values of the ND DB.

A third feature is the comparison of the PBO value of the requested PBO from the TAS mechanism to the DM. This function estimates when the device may be in ND risk area, and based on the requested PBO (which may be requested in order to comply with the SAR regulatory limits or comply with the TAS TX energy budget), determine whether a TBO should be applied instead of the requested PBO. In some aspects, a combination of a reduced PBO amount (i.e., resulting in a higher Tx power) along with complementary TBOs may be applied, where the complementary TBOs compensate for the excess PBO amount. By choosing the TBO instead of the requested PBO in cases where the value of the PBO may cause the device to fall in the disconnection risk range, the device is allowed to transmit in the maximum allowed power (prior to and after applying the TBO), thereby extending the connection versus attenuation to the same extent as if there were no SAR limitations.

The disclosure herein is related to and may supplement a base TAS mechanism that may be implemented in the Medium Access Control (MAC) and/or PHY layers in order to average the SAR over time in order to comply with regulatory or standardization limits, where the base TAS mechanism may be configured to maximize Tx power based on a history of the Tx duty cycle (DC) where lower Tx DCs allow more packets to have a higher Tx power. The base TAS mechanism may control or limit the Tx target power by PBOs and/or TBOs. The disclosure provides additional computations and considerations in determining whether to apply a requested PBO or if it would be better for the communication link to apply a TBO, all the while complying with the SAR regulatory limits. By using a TBO as opposed to a PBO where the requested PBO amount would place the device at risk of disconnection, the device is able to transmit at a higher or maximum allowed power (prior to and after the TBO is applied) and in this way extends the connection range of the device.

Figure 4:
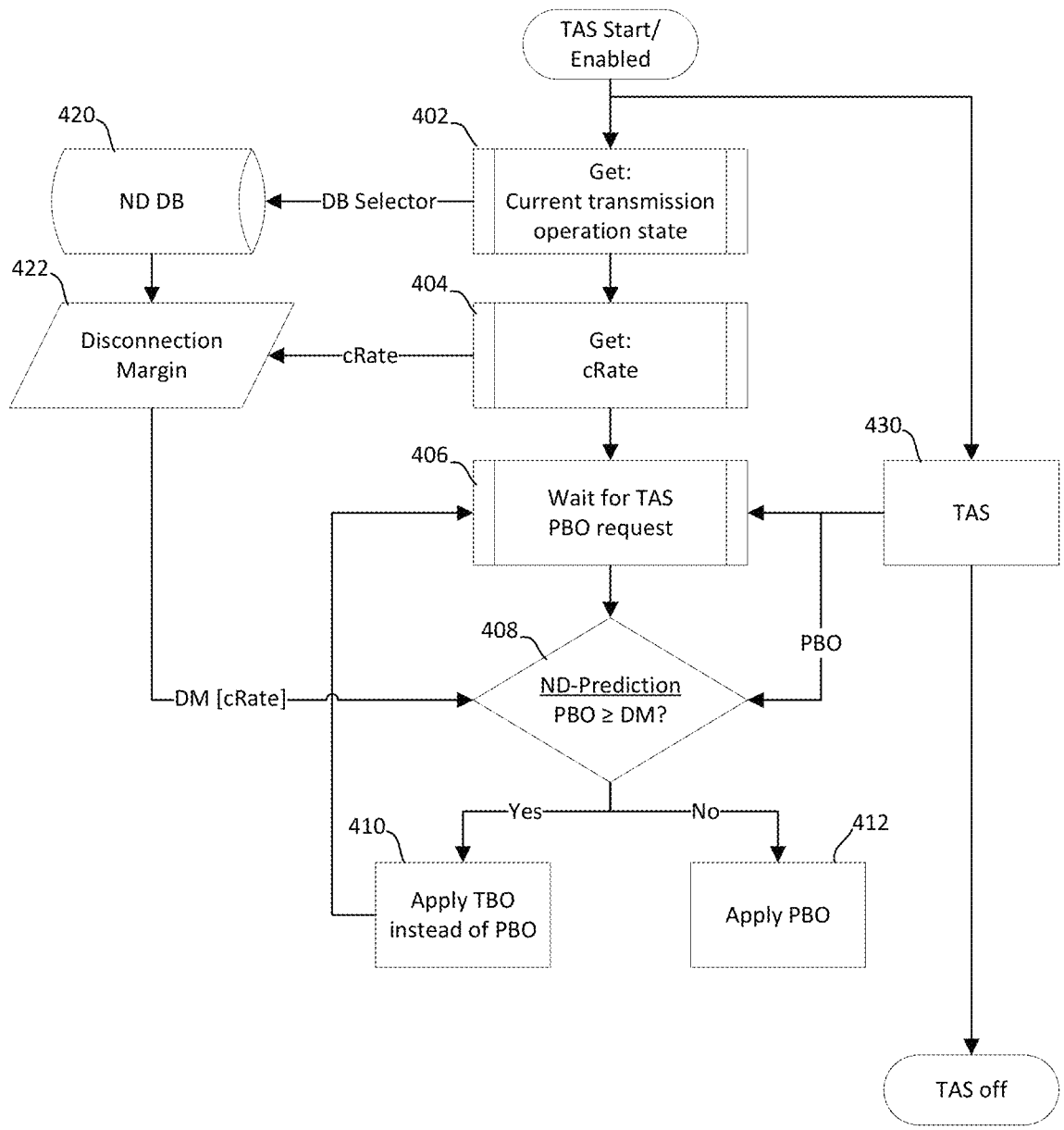
FIG. 4 exemplarily shows a flowchart according to some aspects.

FIG. 4 shows a flowchart 400 describing a method according to some aspects. It is appreciated that flowchart 400 is exemplary in nature and may thus be simplified for purposes of this explanation.

Figure 5:
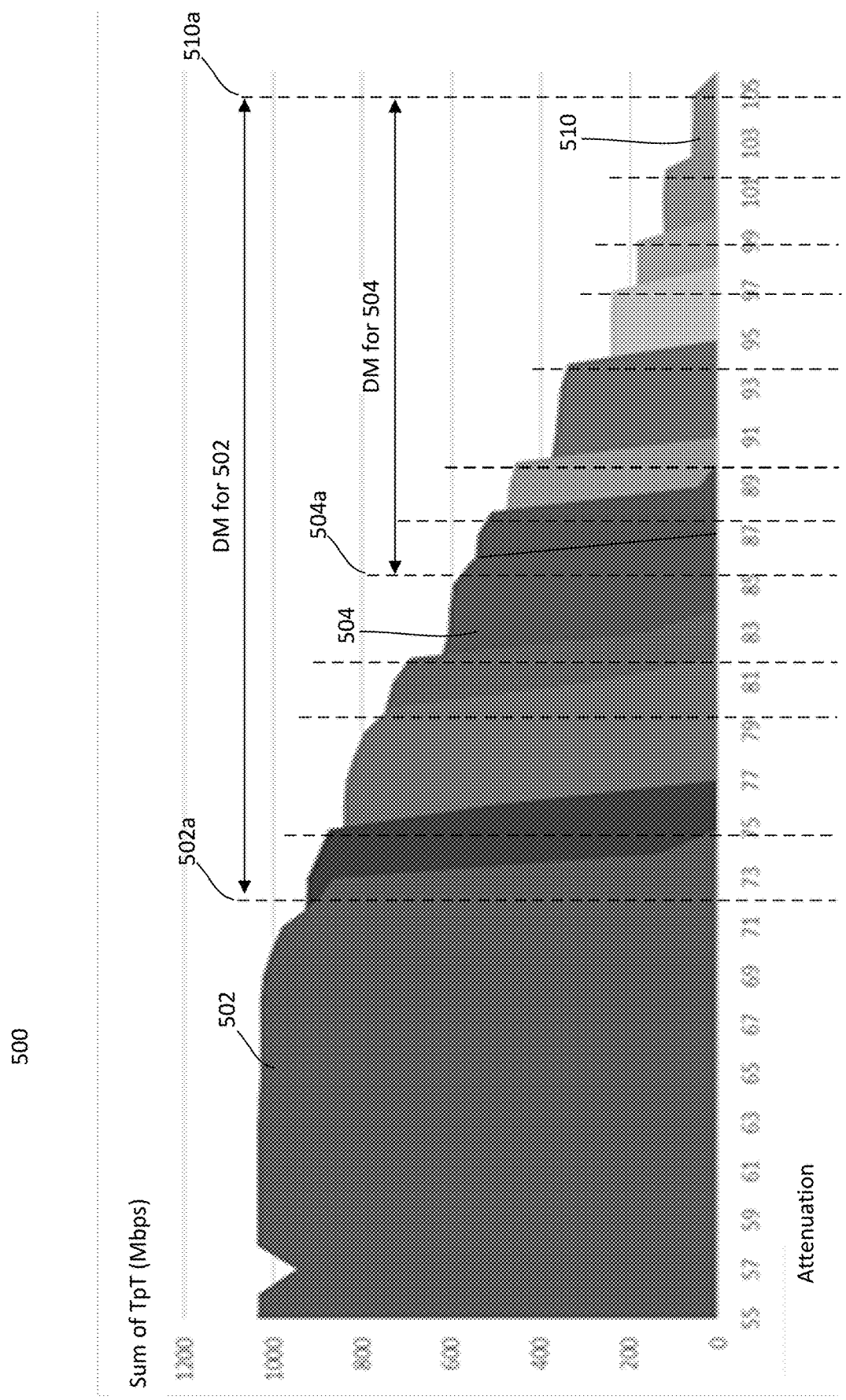
FIG. 5 exemplarily shows a graph illustrating an explanation of a disconnection margin (DM) database according to some aspects.

Once the TAS mechanism is initiated, the method may include obtaining a current transmission operation state including one or more transmission control parameters 402. The transmission control parameters may include one or more of a transmission (Tx) diversity state, a modulation scheme, or an error correcting code (ECC) scheme. For example, the transmission diversity state may be any one of a number of spatial streams (NSS), a single input single output (SISO) setup, a multiple input multiple output (MIMO) setup, or a space-time block code (STBC) technique. For example, the modulation scheme may be a complementary code keying (CCK), orthogonal frequency-division multiplexing (OFDM) modulation, or a quadrature amplitude modulation (QAM) rank. For example, the ECC scheme may be a block check character (BCC) scheme or a low-density parity check (LDPC) scheme. Any one or more of these transmission control parameters may serve to indicate a corresponding dataset to select from a plurality of datasets in the near disconnection database (ND DB) 420. FIG. 5 provides a detailed illustration of one example of a dataset that may be stored in the ND DB 420.

The values stored in the ND DB 420 may be based on calculations and/or measurements determined by one or more of the following options: real-life system measurements in differing levels of noise and/or simulation results from channel emulations of different types including Additive white Gaussian Noise (AWGN) parameters or D-channel parameters. In some aspects, the ND DB may be based on a weighted combination of these options. An additional safe margin (DisconnectSafeMargin) may be added to cover variance through different use cases, environments, and other receiver-side transceiver types.

FIG. 5 shows an exemplary illustrative explanation in the form of an annotated graph 500 of a dataset that may be stored in the ND DB according to some aspects. It is appreciated that graph 500 is exemplary in nature and may thus be simplified for purposes of this explanation. For example, while graph 500 and the description herein use RSSI values as the signal quality strength indicator (SQSI) values for purposes of the explanation, it is appreciated that other SQSI values (e.g., signal to noise ratios) may be used and are included within the scope of this disclosure as well.

Graph 500 is an illustration of dataset values for operation state. The operation state may be determined based on one or more transmission control parameters, including a particular Tx diversity state, modulation, and/or ECC scheme. For example, based on the appropriate transmission control parameters determined in 402, a current transmission operation state corresponding to the dataset shown in graph 500 may be selected.

Graph 500 provides a dataset of the ND DB by way of an exemplary illustration charting the throughput versus attenuation (TvA) relationship that the datasets in the ND DB are based off of. The x-axis represents the signal quality strength quality indicator (SQSI), which in this case, is shown as being the RSSI and is measured in dB. This value may be indicative of the range to the receiver device, for example. The right side of the graph corresponds to a higher attenuation or greater distance to receiver, etc. The y-axis represents the successful throughput, also referred to as the "goodput," which is based on the transmitted packets that are detected at the receiver side.

Each of the different shaded areas shown in the graph represent a different "fixed" PHY rate, or transmission rate, of the dataset. The term "fixed" may refer to the network interface controllers having link control functions that change rates whenever a certain rate is not performing within a required set of parameters, e.g. within a certain packet error rate (PER) threshold. The rate curves in the diagram represent measurement results from a different rate scenario for a transmission control parameter such as modulation/SISO/MIMO, etc. Each rate may have its own data obtained via simulation results or real measurements. While the graph 500 illustrates data for a particular transmission control parameter set, it is appreciated that similar data may be measured/calculated and stored in the ND DB for other transmission control parameters.

For purposes of this explanation, the right most PHY rate (i.e., the lowest shaded area to the right) will be termed "PHY_0" and the numbers may increase in similar fashion all the way to the left-most PHY rate (i.e., 502, the highest shaded area next to the y-axis), which herein referred to as "PHY_11". Each dashed line intersects a different PHY rate of the set. Twelve transmission rates (e.g., PHY rates) are shown in the graph 500, where each of the shaded areas corresponds to a different PHY rate. For purposes of this explanation, two transmission rates, indicated by 502 and 504, are selected.

Each PHY rate has a point from which the throughput degrades. The dashed line intersecting each of the PHY rates marks this point. The point can be defined based on values that represent, for each of a plurality of PHY rates, a corresponding RSSI at which the PHY rate will not be able to maintain a throughput above a predefined threshold. For example, the predefined threshold may be based on a packet error rate (PER) threshold or an error vector magnitude (EVM) threshold. In the PER case, for example, this may be set at 10% PER. In some aspects, this point may be defined as the point at which the throughput (TpT) starts to monotonically decrease at a certain rate, e.g., at a predefined rate.

In other words, for each fixed PHY rate, a maximum attenuation value may be saved to the ND DB that represents the point from the throughput will start to degrade in a monotonic manner or at the predefined rate. For a given setup which locates the device before attenuation is in good dynamic range, this may correspond to an RSSI value that will cause a very low packet error rate (PER). This value may be referred to as the "RateMaxAtt."

The RateMaxAtt measurement may be based on any one or more of the following options: (1) real system measurements where a fixed-rate throughout vs attenuation [TvA] provides the RateMaxAtt of attenuation were the TpT starts to degrade (e.g., 10% PER in Tx may represent this, but other PERs that justify a link quality rate control can also be selected); (2) by monitoring/simulating the PHY constellation error-vector-magnitude (EVM), and setting a limit on it; (3) by monitoring/simulating the PHY error-correction-code (ECC) status that may indicate the number of error bits (either corrected or unrecovered); or (4) any combination of the above.

PHY_0 (i.e., the right most shaded area marked by 510) represents the lowest transmission rate for the dataset that the PHY can operate in. When this rate is no longer sustainable, the throughput may fall of to zero and lead to a disconnection. Line 510a shows this point which indicates the risk of falling within a range of disconnection. In other words, the rate marked by 510 is the lowest rate the device would be able to operate in to maintain user experience and not run at risk of disconnecting. Line 510a illustrates the "lowest_RateMaxAtt" for this exemplary dataset in the ND DB.

Each of the RateMaxAtt values (i.e., the RSSI values of each of the PHY rates) may be stored in the ND DB and may be represented by a SQSI like the RSSI at each rate.

While the values stored in the ND DB may dependent on the channel frequency used, in some aspects, the ND DB may include values stored for each channel frequency. In other aspects, the stored values representing the RateMaxAtt may be minimized to be mutual for all channels, or for a group of channels by selecting a minimum attenuation over all supported channels. In other aspects, one type can be stored in the ND DB and a factor vector can be added to cover other channel types from the same database.

Similarly, while values stored in the ND DB may be dependent on channel bandwidth used, in some aspects, the ND DB may include values stored for each channel bandwidth. In other aspects, the stored values representing the RateMaxAtt may be minimized to be mutual for all channel bandwidths, or for a group of channel bandwidths by selecting the minimum attenuation over all channel bandwidths. In other aspects, one type can be stored in the ND DB and a factor vector can be added to cover other channel bandwidth types from the same database.

Similarly, while values stored in the ND DB may be dependent on different antenna diversity types or RF chain configurations (e.g., single/multiple PHY/RF/antenna chain mechanisms such as single input single output (SISO), multiple input multiple output (MIMO), space-time block coding (STBC), PHY beamforming, R beamforming) the ND DB may include values stored for each antenna diversity type or RF chain configuration. In other aspects, the stored values representing the RateMaxAtt may be minimized to be mutual for all antenna diversity types or RF chain configurations, or for a group of antenna diversity types or RF chain configurations by selecting the minimum attenuation over all antenna diversity types or RF chain configurations. In other aspects, one type can be stored in the ND DB and a factor vector can be added to cover other antenna diversity types or RF chain configurations from the same database.

Similarly, while values stored in the ND DB may be dependent on PHY modulation types used, such as CCK/OFDM, in some aspects, the ND DB may include values stored for each PHY modulation type. In other aspects, the stored values representing the RateMaxAtt may be minimized to be mutual for all PHY modulation types, or for a group of PHY modulation types by selecting the minimum attenuation over all antenna diversity types or RF chain configurations. In other aspects, one type can be stored in the ND DB and a factor vector can be added to cover other PHY modulation types from the same database.

Referring back to FIG. 4, after the current operation state based on one or more transmission control parameters (e.g., Tx diversity state, Modulation, and/or ECC) is determined in 402, the current transmission rate (cRate) is obtained 404. The cRate may correspond to the current PHY rate at which the transmissions are being transmitted.

Based on the selected dataset from the ND DB and the cRate, a disconnection margin (DM) for the cRate (i.e., DM [cRate]) may be determined 422.

The DM is a value determined from a computation that estimates the margin to disconnect based on the dataset of the ND DB. It represents the maximum PBO that can be applied on the transmitter at the current state and rate, where any PBO above this value indicates a high risk that the device will disconnect due to not being able to be detected by the receiver side. The formula for computing the DM for cRate is provided in equation (1):

$$DM(cRate) = \text{lowest\_RateMaxAtt} - cRateMaxAtt - \text{DisconnectSafeMargin} \quad (1)$$

The DM calculation is explained in further detail with reference to FIG. 5 serving as an illustrative example.

Referring to FIG. 5, the RateMaxAtt of the lowest transmission rate (e.g., PHY_0, the shaded area marked by 510) for the current transmission operation state is selected. This corresponds to line 510a with a value of 105 dBs. Then, the RateMaxAtt of the current transmission rate is selected. For example, if the current transmission rate (cRate) is PHY_11 502, then its corresponding RateMaxAtt is shown by line 502a with a value of about 72 dB. The DisconnectSafeMargin is a pre-defined safe margin to cover for bias errors and is intended to prevent disconnections resulting from such errors. In this example, the DisconnectSafeMargin is 3 dB. Accordingly, the DM for a cRate corresponding to PHY_11 502 may be computed as DM=105−72−3=30 dB. In other words, for a current transmission operation state corresponding to the dataset shown in FIG. 5 and for a current transmission rate of PHY_11, the disconnection margin value is determined to be 30 dB. A similar process may be performed for the other rates shown in FIG. 5, e.g., for PHY_7 indicated by 504, where its corresponding RateMaxAtt is marked by dashed line 504a.

In some aspects, if the ND DB was configured with the option to reduce the table data memory size, any SISO/MIMO/STBC/PHY-Beamforming/RF-Beamforming/etc. factors may be added on top as a variable in the formula for DM provided above.

In some aspects, when the device is connected to more than one destination (e.g., connected to two network access nodes), the DM may be calculated for each link and the minimum DM may be taken. For example, if for a first connection, the current transmission operation state and the current transmission rate provide that the lowest_RateMaxAtt is 105 dB and the cRateMaxAtt is 72 dB, and if for a second connection, the second current transmission operation state and the second current transmission rate provide that the lowest_RateMaxAtt is 105 dB and the cRateMaxAtt is 65 dB, then the DM for both links may be determined according to the following equation (assuming a 3 dB DisconnectSafeMargin): DM=min((105−72, (105−65))−3=min (32,40)−3=29 dB.

Referring back to FIG. 4, once the DM [cRate] is determined, it is provided to the ND-Prediction feature 408, which also waits to receive a PBO request from the TAS 430 (e.g., based on a Tx DC and/or a TAS TX energy budget limit) in 406. In 408, the PBO value indicated by the request is compared to the DM calculated for the current transmission rate (cRate). By performing the comparison of the value of the PBO to the DM value, the method is able to provide in which case the PBO may be applied, or if a corresponding TBO should be applied instead to minimize the risk of disconnection.

In some aspects, when the requested PBO includes a PBO value equal to or above the DM value, a near-disconnection indication will prevent the TAS from performing the PBO and apply a TBO instead 410. This will reduce the probability of disconnection.

If the PBO is less than the DM value, however, then the PBO may be applied 412, since the risk of disconnection at the lower Tx power value induced by the PBO would not fall within the ND range (i.e., fall below the lowest_RateMaxAtt with the DisconnectSafeMargin also considered).

In some aspects, a value of the TBO may be determined based on the packet duration times of the requested PBO. In other aspects, the TBO may be applied until an instruction to withdraw the TBO is received. In other aspects, a value of the TBO may be determined by converting the PBO value to an equivalent TBO value, wherein the equivalent TBO value provides a similar energy reduction as the PBO for a duration of the packet OTA. The equivalent TBO time may be computed based on a PBO-to-TBO (PBO2TBO) conversion function. This function may be described by the PBO2TBO=((currentPWR−PBOPWR)*PacketTimeOTA)/currentPWR, where the currentPWR is the current transmission power (in mW), the PBOPWR is the transmission power that the PBO would induce (in mW), and the PacketTimeOTA is the duration of the packet to be transmitted.

Figure 6:
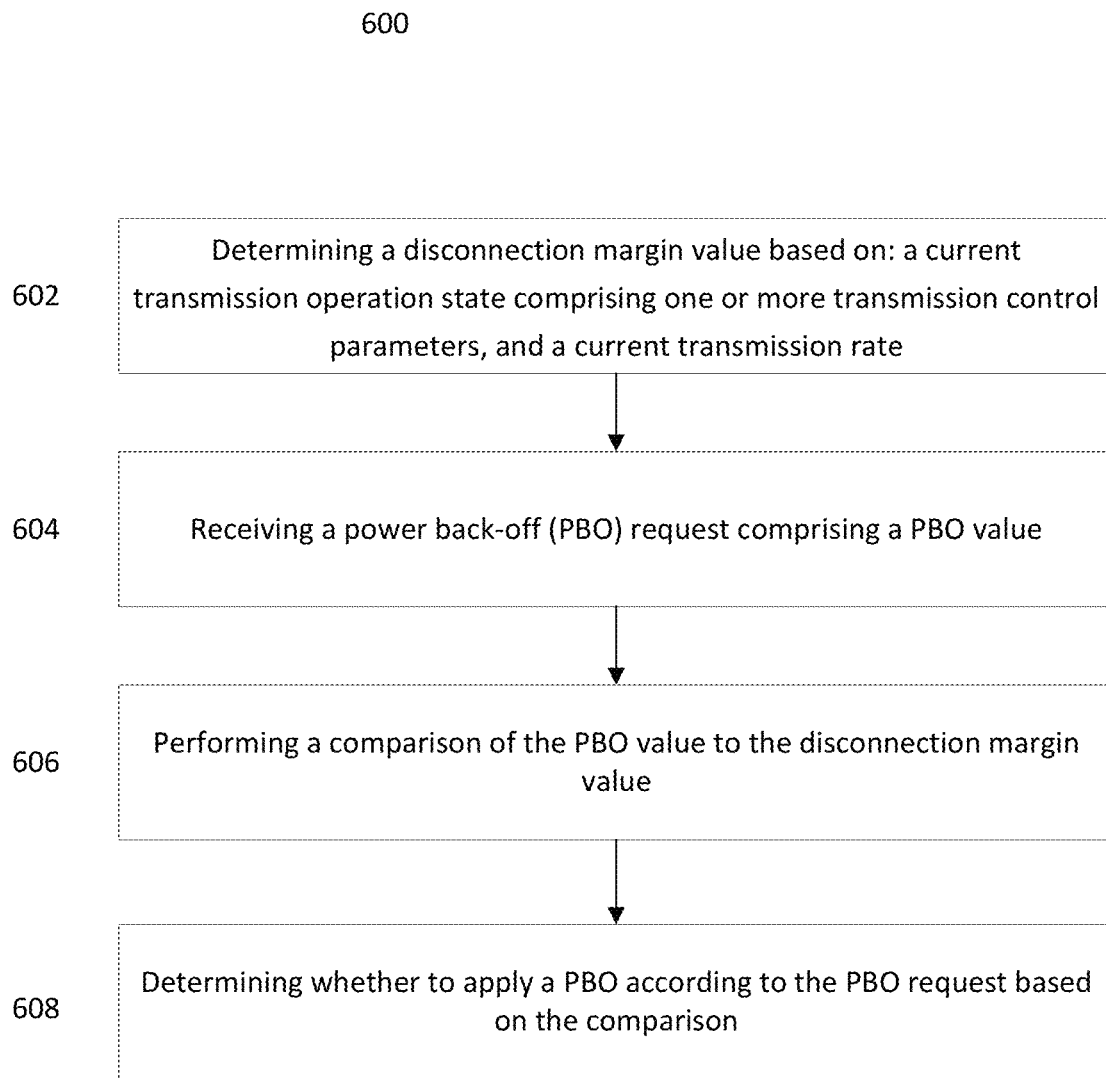
FIG. 6 exemplarily shows a flowchart according to some aspects.

FIG. 6 shows a method flowchart 600 according to some aspects. It is appreciated that method flowchart 600 is exemplary in nature and may thus be simplified for purposes of this explanation.

The method may include determining a disconnection margin value based on: a current transmission operation state including one or more transmission control parameters, and a current transmission rate 602; receiving a power back-off (PBO) request including a PBO value 604; performing a comparison of the PBO value to the disconnection margin value 606; and determining whether to apply a PBO according to the PBO request based on the comparison 608. The method may further include features as disclosed herein.

Figure 7:
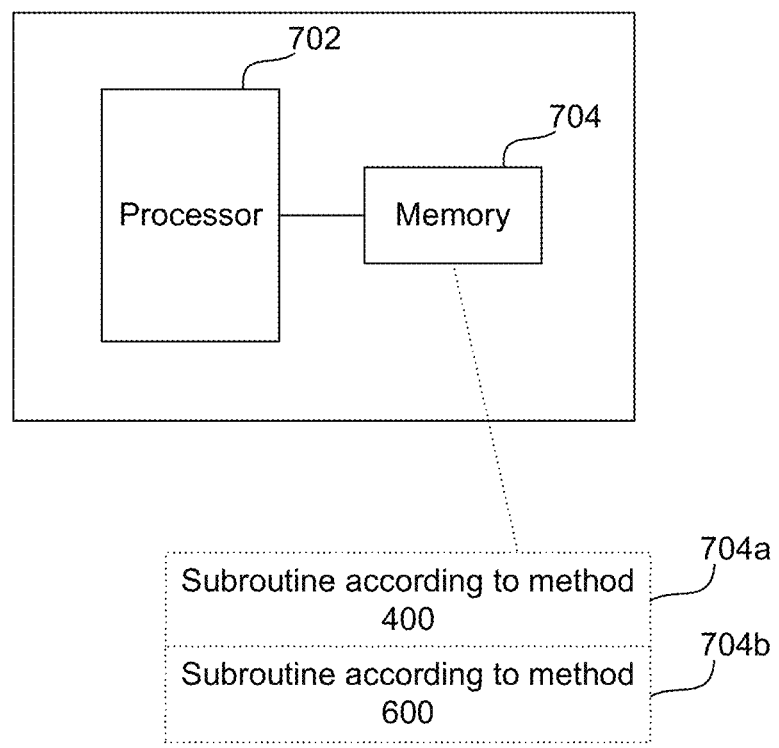
FIG. 7 exemplarily shows an internal configuration of baseband modem according to some aspects.

FIG. 7 shows an internal configuration of a baseband modem according to some aspects. As shown in FIG. 7, the baseband modem of a terminal device may include processor(s) 702 and memory 704. Processor(s) 702 may be a single processor or multiple processors and may be configured to retrieve and execute program code to perform the methods described herein. For example, processor(s) 702 may be included in a baseband modem and/or an application processor of the terminal device. Processor(s) 702 may transmit and receive data over a software-level connection.

Memory 704 may be a non-transitory computer readable medium storing sub-routine instructions 704a, and/or 704b. Memory 704 may be a single memory or may be multiple memories and may be included as internal memories to processor(s) 702 or may be external to processor(s) 702. Memory 704 may be a non-transitory computer readable medium storing one or more sets subroutine instructions for executing one or more of the methods described herein, e.g., methods shown in flowcharts 400 or 600.

The following examples pertain to further aspects of this disclosure:

Example 1 is a device including a processor configured to: determine a disconnection margin value based on a current transmission operation state including one or more transmission control parameters, and a current transmission rate; receive a power back-off (PBO) request including a PBO value; perform a comparison of the PBO value to the disconnection margin value; and determine whether to apply a PBO according to the PBO request based on the comparison.

In Example 2, the subject matter of Example(s) 1 may include where the processor is configured to apply the PBO based on the PBO value being less than disconnection margin value.

In Example 3, the subject matter of Example(s) 1-2 may include where the processor is configured to apply a time back-off (TBO) instead of the PBO based on the PBO value being greater than or equal to the disconnection margin value.

In Example 4, the subject matter of Example(s) 3 may include where the processor is configured to determine a value of the TBO by converting the PBO value to an equivalent TBO value, where the equivalent TBO value provides a similar energy reduction as the PBO.

In Example 5, the subject matter of Example(s) 4 may include where the processor is configured to calculate the equivalent TBO value based on a current transmission power, a target transmission power which would be induced by the PBO, and an over the air (OTA) time of a packet duration.

In Example 6, the subject matter of Example(s) 3 may include where the processor is configured to apply the TBO until receiving an instruction to withdraw the TBO.

In Example 7, the subject matter of Example(s) 3 may include where the processor is configured determine a value of the TBO based on a packet duration of a packet the requested PBO was directed to.

In Example 8, the subject matter of Example(s) 1-7 may include where the processor is configured to determine the disconnection margin value from a database including a plurality of transmission rates based on the one or more transmission control parameters.

In Example 9, the subject matter of Example(s) 8 may include where the one or more transmission control parameters include one or more of an antenna diversity state of an antenna operably coupled to the one or more processors, a modulation scheme, an error correction code (ECC) scheme, a channel frequency, or a channel bandwidth.

In Example 10, the subject matter of Example(s) 8-9 may include where the database includes channel simulations and/or channel measurements factor values from a plurality of different communication channel conditions including different levels of interference.

In Example 11, the subject matter of Example(s) 8-10 may include where the database includes, for each of the plurality of transmission rates, a maximum attenuation value at which a throughput of the respective transmission rate begins to decrease at a pre-defined rate or at which the throughput falls below a pre-defined limit.

In Example 12, the subject matter of Example(s) 11 may include where the maximum attenuation value is determined based on a packet error rate (PER) limit, an error vector magnitude (EVM) limit, or an error correction code (ECC) limit.

In Example 13, the subject matter of Example(s) 11-12 may include where the processor is configured to calculate, for each of the plurality of transmission rates, a respective disconnection margin value based on a maximum attenuation value of a respective transmission rate of the plurality of transmission rates. In some aspects, the respective disconnection margin for each of the plurality of transmission rates reflects the PBO amount that would cause a loss of connection or it reflects the PBO amount that would not be able to maintain a throughput that is above a threshold that ensure a reliable connection at the lowest transmission rate. In other words, the respective disconnection margin indicates a PBO value that would result in the throughput falling below a certain threshold at which connectivity is no longer reliable.

In Example 14, the subject matter of Example(s) 13 may include where the processor is configured to calculate the respective disconnection margin value for each of the plurality of transmission rates based on a difference between the maximum attenuation value of the respective transmission rate of the plurality of transmission rates and a maximum attenuation value of a lowest transmission rate of the plurality of transmission rates.

In Example 15, the subject matter of Example(s) 11-14 may include where the processor is configured to match the current transmission rate to one of the plurality of transmission rates, where the disconnection margin value is based on the respective disconnection margin value of the matched transmission rate.

In Example 16, the subject matter of Example(s) 15 may include where the processor is configured to compute the disconnection margin value by subtracting a disconnection safe margin value from the respective disconnection margin value of the matched transmission rate.

In Example 17, the subject matter of Example(s) 1-16 may include where the processor is configured to calculate the disconnection margin value for each of a plurality of communication links.

In Example 18, the subject matter of Example(s) 17 may include where a minimum function is applied to the determination of the disconnection margin value for the plurality of communication links.

Example 19 is a device including: a determiner configured to determine a disconnection margin value based on: a current transmission operation state including one or more transmission control parameters, and a current transmission rate; a receiver configured to receive a power back-off (PBO) request including a PBO value; a comparator configured to perform a comparison of the PBO value to the disconnection margin value; and an applier configured to determine whether to apply a PBO according to the PBO request based on the comparison.

Example 20 is a device including means to determine a disconnection margin value based on: a current transmission operation state including one or more transmission control parameters, and a current transmission rate; means to receive a power back-off (PBO) request including a PBO value; means to perform a comparison of the PBO value to the disconnection margin value; and means to determine whether to apply a PBO according to the PBO request based on the comparison.

Example 21 is a method including determining a disconnection margin value based on: a current transmission operation state including one or more transmission control parameters, and a current transmission rate; receiving a power back-off (PBO) request including a PBO value; performing a comparison of the PBO value to the disconnection margin value; and determining whether to apply a PBO according to the PBO request based on the comparison.

In Example 22, the subject matter of Example(s) 21 may include applying the PBO based on the PBO value being less than disconnection margin value.

In Example 23, the subject matter of Example(s) 21-22 may include applying a time back-off (TBO) instead of the PBO based on the PBO value being greater than or equal to the disconnection margin value.

In Example 24, the subject matter of Example(s) 23 may include determining a value of the TBO by converting the PBO value to an equivalent TBO value, where the equivalent TBO value provides a similar energy reduction as the PBO.

In Example 25, the subject matter of Example(s) 24 may include calculating the equivalent TBO value based on a current transmission power, a target transmission power which would be induced by the PBO, and an over the air (OTA) time of a packet duration.

In Example 26, the subject matter of Example(s) 23 may include applying the TBO until receiving an instruction to withdraw the TBO.

In Example 27, the subject matter of Example(s) 23 may include determining a value of the TBO based on a packet duration of a packet the requested PBO was directed to.

In Example 28, the subject matter of Example(s) 21-27 may include determining the disconnection margin value from a database including a plurality of transmission rates based on the one or more transmission control parameters.

In Example 29, the subject matter of Example(s) 28 may include where the one or more transmission control parameters include one or more of an antenna diversity state of an antenna operably coupled to the one or more processors, a modulation scheme, an error correction code (ECC) scheme, a channel frequency, or a channel bandwidth.

In Example 30, the subject matter of Example(s) 28-29 may include where the database includes channel simulations and/or channel measurements factor values from a plurality of different communication channel conditions including different levels of interference.

In Example 31, the subject matter of Example(s) 28-30 may include where the database includes, for each of the plurality of transmission rates, a maximum attenuation value at which a throughput of the respective transmission rate begins to decrease at a pre-defined rate or at which the throughput falls below a pre-defined limit.

In Example 32, the subject matter of Example(s) 31 may include where the maximum attenuation value is determined based on a packet error rate (PER) limit, an error vector magnitude (EVM) limit, or an error correction code (ECC) limit.

In Example 33, the subject matter of Example(s) 31-32 may include calculating, for each of the plurality of transmission rates, a respective disconnection margin value based on a maximum attenuation value of a respective transmission rate of the plurality of transmission rates.

In Example 34, the subject matter of Example(s) 33 may include calculating the respective disconnection margin value for each of the plurality of transmission rates based on a difference between the maximum attenuation value of the respective transmission rate of the plurality of transmission rates and a maximum attenuation value of a lowest transmission rate of the plurality of transmission rates.

In Example 35, the subject matter of Example(s) 31-34 may include matching the current transmission rate to one of the plurality of transmission rates, where the disconnection margin value is based on the respective disconnection margin value of the matched transmission rate.

In Example 36, the subject matter of Example(s) 35 may include computing the disconnection margin value by subtracting a disconnection safe margin value from the respective disconnection margin value of the matched transmission rate.

In Example 37, the subject matter of Example(s) 21-36 may include calculating the disconnection margin value for each of a plurality of communication links.

In Example 38, the subject matter of Example(s) 37 may include where a minimum function is applied to the determination of the disconnection margin value for the plurality of communication links.

Example 39 is one or more non-transitory computer readable media, including instructions, which when executed perform the method or realize a device of any preceding example.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
    determine a disconnection margin value based on:
        a current transmission operation state comprising one or more transmission control parameters, and
        a current transmission rate;
    receive a power back-off (PBO) request comprising a PBO value;
    perform a comparison of the PBO value to the disconnection margin value; and
    determine whether to apply a PBO according to the PBO request based on the comparison.

2. The device of claim 1, wherein the processor is configured to apply the PBO based on the PBO value being less than disconnection margin value.

3. The device of claim 1, wherein the processor is configured to apply a time back-off (TBO) instead of the PBO based on the PBO value being greater than or equal to the disconnection margin value.

4. The device of claim 3, wherein the processor is configured to determine a value of the TBO by converting the PBO value to an equivalent TBO value, wherein the equivalent TBO value provides a similar energy reduction as the PBO.

5. The device of claim 4, wherein the processor is configured to calculate the equivalent TBO value based on a current transmission power, a target transmission power which would be induced by the PBO, and an over the air (OTA) time of a packet to be transmitted.

6. The device of claim 3, wherein the processor is configured to apply the TBO until receiving an instruction to withdraw the TBO.

7. The device of claim 1, wherein the processor is configured to determine the disconnection margin value from a database comprising a plurality of transmission rates based on the one or more transmission control parameters.

8. The device of claim 7, wherein the one or more transmission control parameters comprise one or more of an antenna diversity state of an antenna operably coupled to the one or more processors, a modulation scheme, an error correction code (ECC) scheme, a channel frequency, or a channel bandwidth.

9. The device of claim 7, wherein the database comprises channel simulations and/or channel measurements factor values from a plurality of different communication channel conditions comprising different levels of interference.

10. The device of claim 7, wherein the database comprises, for each of the plurality of transmission rates, a maximum attenuation value at which a throughput of the respective transmission rate begins to decrease at a pre-defined rate or at which the throughput falls below a pre-defined limit.

11. The device of claim 10, wherein the maximum attenuation value is determined based on a packet error rate (PER) limit, an error vector magnitude (EVM) limit, or an error correction code (ECC) limit.

12. The device of claim 10, wherein the processor is configured to calculate, for each of the plurality of transmission rates, a respective disconnection margin value based on a maximum attenuation value of a respective transmission rate of the plurality of transmission rates.

13. The device of claim 12, wherein the processor is configured to calculate the respective disconnection margin value for each of the plurality of transmission rates based on a difference between the maximum attenuation value of the respective transmission rate of the plurality of transmission rates and a maximum attenuation value of a lowest transmission rate of the plurality of transmission rates, wherein the respective disconnection margin value indicates a PBO value that would result in throughput falling below a certain threshold for the lowest transmission rate.

14. A method comprising:
 determining a disconnection margin value based on:
  a current transmission operation state comprising one or more transmission control parameters, and
  a current transmission rate;
 receiving a power back-off (PBO) request comprising a PBO value;
 performing a comparison of the PBO value to the disconnection margin value; and
 determining whether to apply a PBO according to the PBO request based on the comparison.

15. The method of claim 13, further comprising:
 applying the PBO based on the PBO value being less than disconnection margin value.

16. The method of claim 13, further comprising:
 applying a time back-off (TBO) instead of the PBO based on the PBO value being greater than or equal to the disconnection margin value.

17. The method of claim 16, further comprising:
 determining a value of the TBO by converting the PBO value to an equivalent TBO value, where the equivalent TBO value provides a similar energy reduction as the PBO.

18. The method of claim 17, further comprising:
 calculating the equivalent TBO value based on a current transmission power, a target transmission power which would be induced by the PBO, and an over the air (OTA) time of a packet duration.

19. One or more non-transitory computer readable media with instructions stored thereon that, when executed by a processor of a device, cause the device to:
 determine a disconnection margin value based on:
  a current transmission operation state comprising one or more transmission control parameters, and
  a current transmission rate;
 receive a power back-off (PBO) request comprising a PBO value;
 perform a comparison of the PBO value to the disconnection margin value; and
 determine whether to apply a PBO according to the PBO request based on the comparison.

20. The one or more non-transitory computer readable media of claim 19, further comprising instructions to cause the device to:
 apply the PBO based on the PBO value being less than disconnection margin value, or
 apply a time back-off (TBO) instead of the PBO based on the PBO value being greater than or equal to the disconnection margin value.

\* \* \* \* \*